May 28, 1929. A. J. MICHELIN 1,715,302
MULTIPLE WIRE REENFORCE FOR AUTOMOBILE TIRES
Filed July 2, 1927 2 Sheets-Sheet 1

Inventor
André J. Michelin
by Wilkinson & Giusta
Attorneys.

May 28, 1929. A. J. MICHELIN 1,715,302
MULTIPLE WIRE REENFORCE FOR AUTOMOBILE TIRES
Filed July 2, 1927 2 Sheets-Sheet 2

Inventor
André J. Michelin
by
Wilkinson & Giusta
Attorneys.

Patented May 28, 1929.

1,715,302

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

MULTIPLE-WIRE REENFORCE FOR AUTOMOBILE TIRES.

Application filed July 2, 1927, Serial No. 203,132, and in France July 2, 1926.

Metallic reenforces, commonly known as "wires" for the beads of the casings of pneumatic tires are well known. Such reenforces usually consist either of a single metal thread in the form of a closed loop, or of a single metal thread forming a core around which another metal thread is wound spirally, the ends being joined together to form a closed loop.

It is known that within limits, the resistance and suppleness of cables are greater, in proportion as the threads which form them are drawn more finely; and my present invention has for its object the formation of metal reenforces for the beads of pneumatic tire casings of greater resistance and suppleness, by replacing the thick single wire (surrounded or not by a spiral winding) with a built-up metal reenforce.

In the annexed drawings, several methods of attaining the object of the invention are shown, by way of examples.

Figure 1:
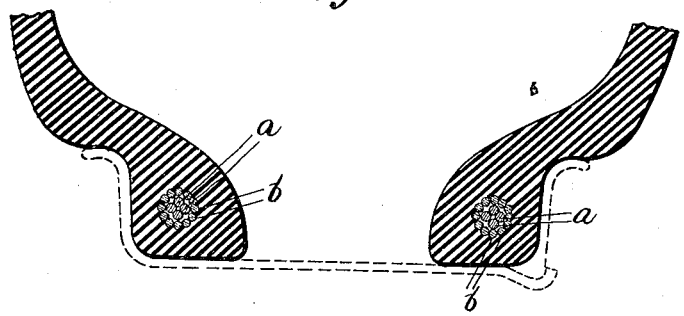
Fig. 1 shows a cross-section through the beads of a tire casing.
Figure 2:
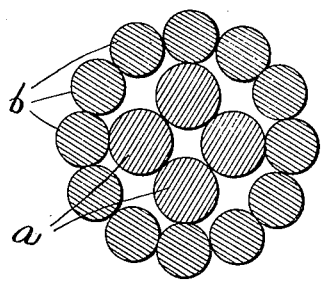
Fig. 2 represents a section on a larger scale, of the metal reenforce shown in Fig. 1 and taken on the line 2—2 of Fig. 3.
Figure 3:
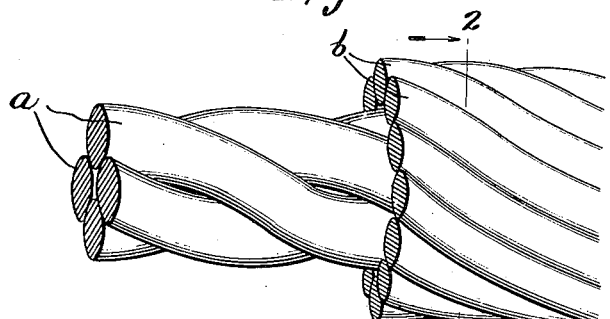
Fig. 3 is a perspective view of the reenforce shown in Figs. 1 and 2.

Referring to Figs. 2 and 3, the reenforce consists of a core formed of several threads $a$ twisted together so as to form a single strand. Around this core, a layer of threads $b$ is wound in spirals.

Figure 4:
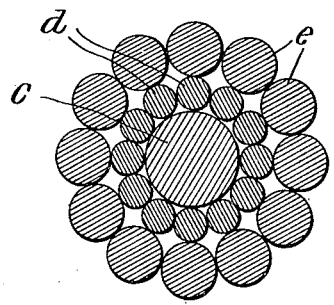
Fig. 4 is a section of a reenforce, the core of which is formed by a single wire and taken on the line 4—4 of Fig. 5.
Figure 5:
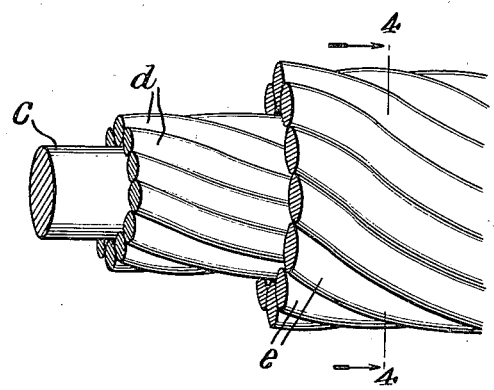
Fig. 5 represents the reenforce of Fig. 4, as seen in perspective.
Figure 8:
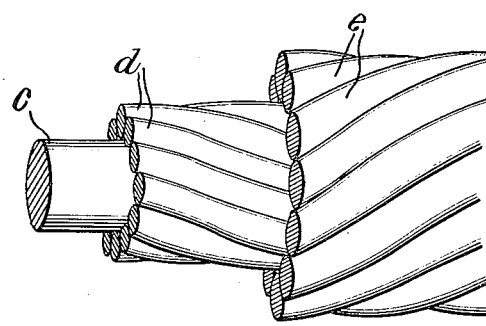
Fig. 8 is a perspective view of a reenforce, similar in cross-section to that shown in Fig. 4, but in which the outside threads are wound in the direction opposite to that of the threads forming the core.

In the reenforces represented in Figs. 4, 5 and 8, the core consists of a cable formed of a single thread $c$, around which threads $d$ are wound. A layer of threads $e$ is then wound around this core.

The winding pitch of the threads $e$ may be either the same as that of threads $d$ (see Fig. 5), or the opposite (see Fig. 8).

The method of winding represented in Fig. 8, which consists in having the winding pitch of one thread on a previous winding done in the opposite direction, is preferable; as this facilitates the construction of the reenforce, and gives a wider choice as to the thickness of the threads to be used.

Figure 6:
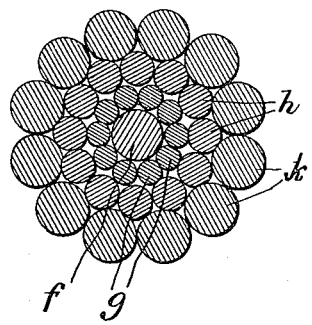
Fig. 6 is a section of a reenforce, the core of which is itself formed of a multiple series of wires and taken on the line 6—6 of Fig. 7.
Figure 7:
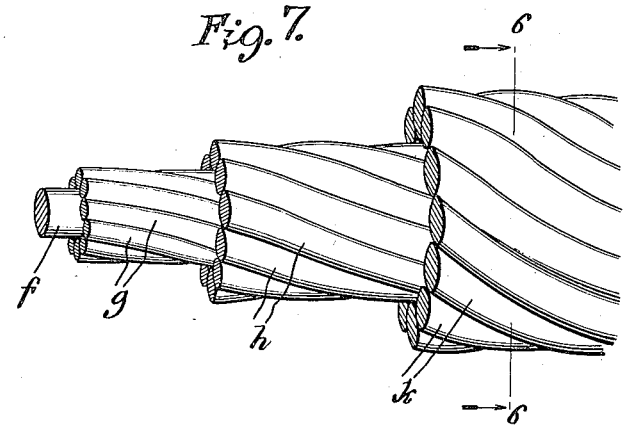
Fig. 7 is a perspective view of the reenforce shown in Fig. 6.

In the reenforce represented in Figs. 6 and 7, the core consists of a cable, in which a single thread $f$ is surrounded by two layers of threads $g$ and $h$, wound in spirals. This core is surrounded by a layer of threads $k$, which may be wound either in the same direction as the previous layers, or in the opposite direction.

As may be seen from the drawings, different combinations for forming multiple strand reenforces are possible.

While the central core may be of a single wire, as shown in Figs. 4 to 8, the core may be built up of a group of wires, as shown in Figs. 2 and 3, or the central core may be replaced by a group of such wires, resulting in a core formed of several threads drawn more or less fine, instead of one single thick thread.

As a result, the resistance and suppleness of the wires, under the invention, are notably greater, given equal thickness and equal weight of wires.

It should be understood that the invention is not limited to the examples represented, but that any metal reenforce for pneumatic tire casings, the core of which consists, not of one thread, but of a body of several threads, forming a built-up strand, may be used without departing from the spirit of the invention.

The ends of the various wires comprising the cable may be united by brazing, electric welding, tin soldering, or by any other suitable means, to form a closed band or loop to be embedded later in the bead of the tire casing.

Having thus described my invention, what I claim and desire to secure by Letters Patent of the United States is:

A metal reenforce for beads of pneumatic tire casings, comprising superposed concentric layers of independent wires, each wire having its ends secured together to form a closed band, and each of said layers being independent of the other layers and having its wires wound in a direction reversely to the winding of the wires of an adjacent layer.

ANDRÉ JULES MICHELIN.